United States Patent [19]

Uehara

[11] Patent Number: 5,604,580
[45] Date of Patent: Feb. 18, 1997

[54] OPTICAL RADAR APPARATUS FOR VEHICLE

[75] Inventor: Naohisa Uehara, Himeji, Japan

[73] Assignee: Mitsubishi Denki Kabushiki Kaisha, Tokyo, Japan

[21] Appl. No.: 385,881

[22] Filed: Feb. 9, 1995

[30] Foreign Application Priority Data

Feb. 10, 1994 [JP] Japan ................................. 6-016840

[51] Int. Cl.$^6$ .............................. B60T 7/16; B60Q 1/00; G01B 3/36; G01C 3/08

[52] U.S. Cl. ............................ 356/28; 180/169; 340/435; 356/4.01

[58] Field of Search ..................... 356/28, 4.01; 180/169; 340/435

[56] References Cited

U.S. PATENT DOCUMENTS

| | | | |
|---|---|---|---|
| 4,245,560 | 1/1981 | Rambauske | 102/213 |
| 4,380,391 | 4/1983 | Buser et al. | 382/34 |
| 4,477,184 | 10/1984 | Endo | 180/169 |
| 4,497,065 | 1/1985 | Tisdale et al. | 382/1 |
| 5,396,426 | 3/1995 | Hibino et al. | 364/426.04 |
| 5,461,357 | 10/1995 | Yoshioka et al. | 340/435 |
| 5,475,494 | 12/1995 | Nishida et al. | 180/169 |
| 5,504,569 | 4/1996 | Kato et al. | 180/169 |

FOREIGN PATENT DOCUMENTS

| | | |
|---|---|---|
| 0215948 | 4/1987 | European Pat. Off. . |
| 120877 | 1/1986 | Japan . |
| 2143395 | 2/1985 | United Kingdom . |
| 9425877 | 11/1994 | WIPO . |

Primary Examiner—Stephen C. Buczinski
Attorney, Agent, or Firm—Sughrue, Mion, Zinn, Macpeak & Seas

[57] ABSTRACT

A vehicular optical radar apparatus can identify various types of obstacles as well as a preceding vehicle, thereby ensuring a reliable identification of the preceding vehicle running in the same lane as with a subject vehicle on which the apparatus is installed. A scanner scans light emitted from a light emitting device and radiates it. A light receiving device receives the light which is radiated by the scanner and is then reflected by an object. A received-light intensity detection device detects an intensity of the reflected light received by the light receiving device. An obstacle identifying device identifies the object according to the distribution pattern of the received-light intensity detected by the intensity detection device, such a pattern being obtained with respect to the direction of scanning performed by the scanner.

7 Claims, 11 Drawing Sheets

OPTICAL RADAR APPARATUS FOR VEHICLE

BACKGROUND OF THE INVENTION

1. Field of the Invention

The present invention relates to an optical radar apparatus for a vehicle identifying an obstacle to the vehicle by detecting pulsed laser beams reflected from objects.

2. Description of the Related Art

Follow-up running controllers disclosed in, for example, Japanese Patent Laid-Open Nos. 55-86000 and 60-239900, are known as conventional vehicular optical radar apparatuses. Each of the controllers monitors objects lying ahead of a vehicle by means of a radar apparatus, which uses light or radio waves, provided at the forward portion of the vehicle so as to detect an obstacle such as a preceding vehicle running ahead of the vehicle (hereinafter referred to as a subject vehicle) on which the radar apparatus is mounted. Thus, such controllers are used to control the speed of the subject vehicle so that a safe distance between the subject vehicle and a preceding vehicle can be maintained.

Moreover, an optical radar apparatus disclosed in Japanese Patent Publication No. 3-30117 is known as another type of conventional vehicular optical radar apparatus. Such an apparatus outputs a received-light signal when the set intensity of the reflected light is reached. Then, various values representing the distance to the object are obtained according to a plurality of the received-light signals which are output within the scanning angle. When such a disparity of the distance is equal to or less than a predetermined value, the optical radar apparatus determines and outputs the value representing the distance detected as a distance which should be kept between the subject vehicle and a preceding vehicle. The apparatus determines the set intensity of the reflected light according to the reflectance factor of reflectors, thereby enabling the detection of the reflectors only with high accuracy. The apparatus also detects the distance to the reflectors for a plurality of times within the set scanning angle, that is, within the width of a preceding vehicle. Then, when the values representing the distance are substantially equal to each other, the apparatus determines that the detected obstacle is a pair of reflectors in a pair of tail lamps provided on a preceding vehicle and outputs the detected distance as a distance which should be kept between the subject vehicle and the preceding vehicle.

However, the above-mentioned follow-up running controllers used as conventional vehicular optical radar apparatuses pose the following problems. Since they are unable to identify the type of the detected obstacle, they can not discern or predict road environments such as the kind of a road (non-expressway, expressway) on which the subject vehicle is running, and they also can not sense or predict a running environment of a lane such as a curved or straight course in which the subject vehicle is running. Thus, when identifying a preceding vehicle, the apparatus is sometimes adversely influenced by the road environment and the running environment. Accordingly, there often is a case in which the apparatus erroneously identifies a preceding vehicle, that is, it fails to identify with high precision a preceding vehicle running in the same lane as the subject vehicle. For example, at a curve, such an apparatus as a conventional follow-up running controller sometimes mistakes a vehicle running in the adjacent lane for a preceding vehicle in the same lane as the subject vehicle, and also erroneously identifies a road sign or a delineator disposed on the surface of a road as a preceding vehicle. Such errors caused by the radar apparatus used as a follow-up running controller not only impair riding comfort, but also may lead to a serious accident.

The above problems can be solved by such means as identifying a delineator. Then, the transverse position of the subject vehicle from the delineator can be calculated by the detected distance and angle, thereby assuming an environment of the lane in which the subject vehicle is running. Besides, the identification of a delineator makes it possible to infer the curvature of a road, thereby assuming an environment of the lane in which the subject vehicle is running. Thus, it is possible to identify a preceding vehicle running in the same lane as with the subject vehicle.

However, the conventional optical radar apparatus described above also presents the following problems. Namely, since it identifies a preceding vehicle merely by detecting a pair of reflectors provided on a rear end thereof in a transversely spaced relation, it is unable to recognize a road environment, a running environment, and the like. Hence, it is impossible for the conventional optical radar apparatus to determine whether the preceding vehicle detected is running in the same lane as with the subject vehicle, thus resulting in failing to accurately identify a preceding vehicle.

SUMMARY OF THE INVENTION

Accordingly, in order to overcome the above drawbacks, an object of the present invention is to provide an optical radar apparatus for a vehicle which can identify various types of obstacles other than vehicles, thereby enabling highly accurate identification of a preceding vehicle running in the same lane as with the subject vehicle.

In order to achieve the above object, according to the present invention, there is provided a vehicular optical radar apparatus comprising: optical radiation means for scanning and radiating light; light receiving means for receiving light which is radiated by the optical radiation means and is then reflected by an object; received-light intensity detection means for detecting the intensity of the reflected light; and obstacle identifying means for identifying the object based on a distribution pattern of the received-light intensity detected by the intensity detection means, the distribution pattern being obtained with respect to the direction scanned performed by the optical radiation means.

With this arrangement, various types of obstacles can be identified according to the distribution pattern of the received-light intensity with respect to the scanning direction.

In a preferred form of the invention, the vehicular optical radar apparatus may further comprise distance calculation means for calculating a distance to the object based on a propagation lag duration from the time when the light is radiated by the optical radiation means to the time when the reflected light is received by the light receiving means. The obstacle identifying means identifies the object based on the distance calculated by the distance calculation means and the distribution pattern of the received-light intensity with respect to the scanning direction.

With this arrangement, various types of obstacles can be identified with high accuracy according to the calculated distance and the distribution pattern of the received-light intensity with respect to the scanning direction.

In another preferred form of the invention, the vehicular optical radar apparatus may further comprise running speed detection means for detecting a running speed of a subject vehicle on which the apparatus is installed. The obstacle identifying means calculates a running speed of the object based on the running speed detected by the running speed detection means and a relative speed of the object to the subject vehicle, the relative speed being calculated by a change in the detected distance to the object in chronological order, thereby identifying the object, based on the distance to the object, the distribution pattern of the received-light intensity with respect to the scanning direction and the running speed of the object.

With this arrangement, various types of obstacles can be identified with higher accuracy according to the calculated distance, the distribution pattern of the received-light intensity with respect to the scanning direction and the speed of the object.

In a further preferred form of the invention, the vehicular optical radar apparatus may further comprise object-width calculation means for calculating a width of the object based on a scanning angle of the optical radiation means and the distance calculated by the distance calculation means. The obstacle identifying means identifies the object based on the distance calculated by the distance calculation means, the distribution pattern of the received-light intensity with respect to the scanning direction and the width of the object.

With this arrangement, various types of obstacles can be identified with higher accuracy according to the calculated distance, the distribution pattern of the received-light intensity with respect to the scanning direction and the width of the object.

In a further preferred form of the invention, the obstacle identifying means may identify that the object is a four-wheeled vehicle when the width of the object falls within a predetermined range and when the distribution pattern of the received-light intensity with respect to the scanning direction is formed such that the intensity of the received light has two high levels with a lower level present therebetween.

With this arrangement, a preceding four-wheeled vehicle can be identified with higher accuracy.

In a further preferred form of the invention, the obstacle identifying means may identify that the object is a road sign when the width of the object extends over a predetermined range and when the distribution pattern of the received-light intensity with respect to the scanning direction is uniform.

With this arrangement, a road sign can be identified with high accuracy and be prevented from being mistaken for a preceding four-wheeled vehicle.

In a further preferred form of the invention, a vehicular optical radar apparatus may further comprise running speed detection means for detecting a running speed of a subject vehicle. The obstacle identifying means calculates a running speed of the object based on the running speed detected by the running speed detection means and a relative speed of the object to the subject vehicle, the relative speed being calculated by a change in the detected distance to the object in chronological order, thereby identifying the object, based on the distance to the object, the distribution pattern of the received-light intensity with respect to the scanning direction, and the width and the running speed of the object.

With this arrangement, various types of obstacles can be identified with higher accuracy according to the calculated distance, the distribution pattern of the received-light intensity with respect to the scanning direction, and the width and the speed of the object.

The above and other objects, features and advantages of the present invention will become apparent from the following detailed description of preferred embodiments of the invention taken in conjunction with the accompanying drawings.

DESCRIPTION OF THE PREFERRED EMBODIMENTS

Figure 1:
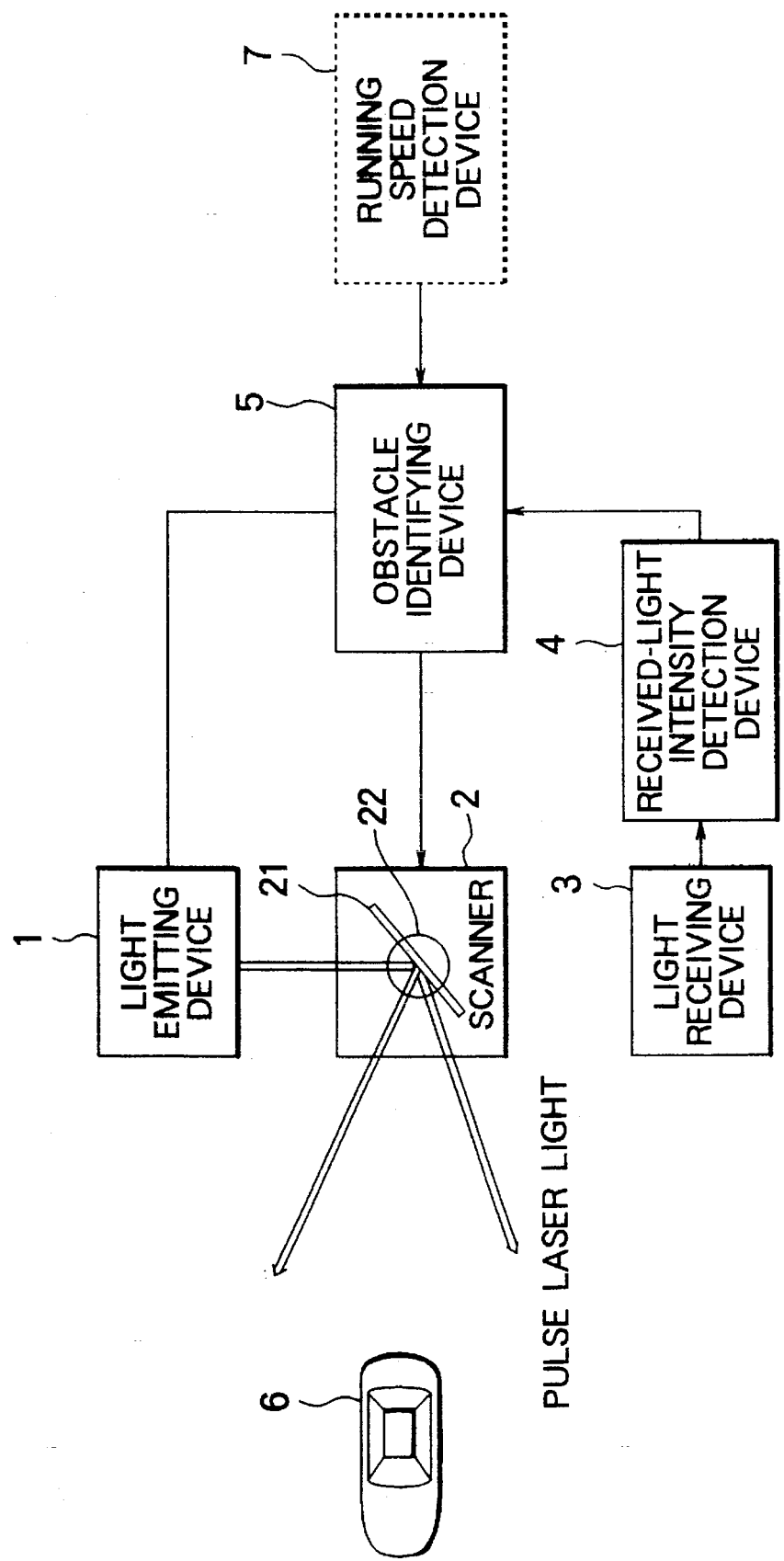
FIG. 1 is a block diagram illustrative of the construction of one embodiment of the present invention.

Embodiments of the present invention will now be described with reference to the accompanying drawings. The same reference numerals denote the same components throughout the drawings.

First Embodiment

Referring to FIG. 1, there is shown a vehicular optical radar apparatus constructed in accordance with a first embodiment of the present invention. The apparatus of this embodiment comprises: a light emitting device 1 for emitting a pulsed laser beam, the device having a rectangular shape in cross section in which the longitudinal direction is perpendicular to a scanning direction thereof; a scanner 2 for scanning and radiating the pulsed laser beam emitted from the light emitting device 1; a light receiving device 3 for receiving the light which is radiated by the scanner 2 and is then reflected by an object 6; a received-light intensity detection device 4 for detecting the intensity of the reflected light received by the light receiving device 3; and an obstacle identifying device 5 for identifying an obstacle, that is, the object 6, based on the output from the light-receiving intensity detection device 4. The scanner 2 is disposed at an angle of 45° with respect to the optical axis of the light emitting device 1 and comprises a mirror 21 for reflecting a pulsed laser beam emitted from the light emitting device 1, and a stepping motor 22 for rotating or oscillating the mirror 21 so as to scan the pulsed laser beam.

Figure 2:
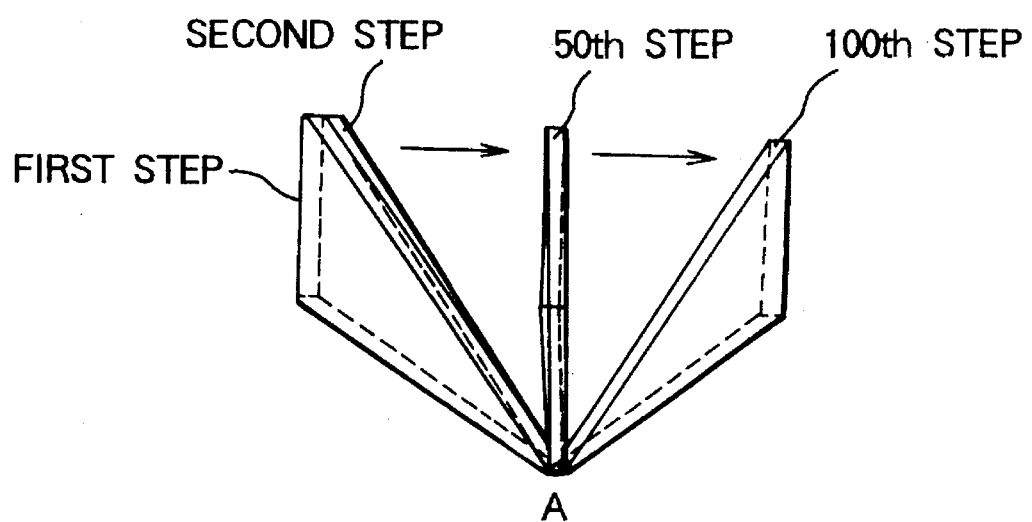
FIG. 2 illustrates the steps taken in the optical scanning.

In the optical radar apparatus constructed as described above, it will now be assumed by way of example that the pulsed laser beam is scanned for 100 steps in total from the left to the right, as shown in FIG. 2. FIG. 2 illustrates the radiation point of the pulsed laser beam as indicated at point A and shows the laser beam diverging to radiate from the bottom to the top in the respective steps. In each step, the light emitting device 1 is driven to emit the pulsed laser beam, which is then reflected by the object 6 and is further received by the light receiving device 3. Subsequently, the intensity of the reflected pulsed laser beam is detected by the received-light intensity detection device 4 and is stored by the obstacle identifying device 5 therein.

Figure 3A:
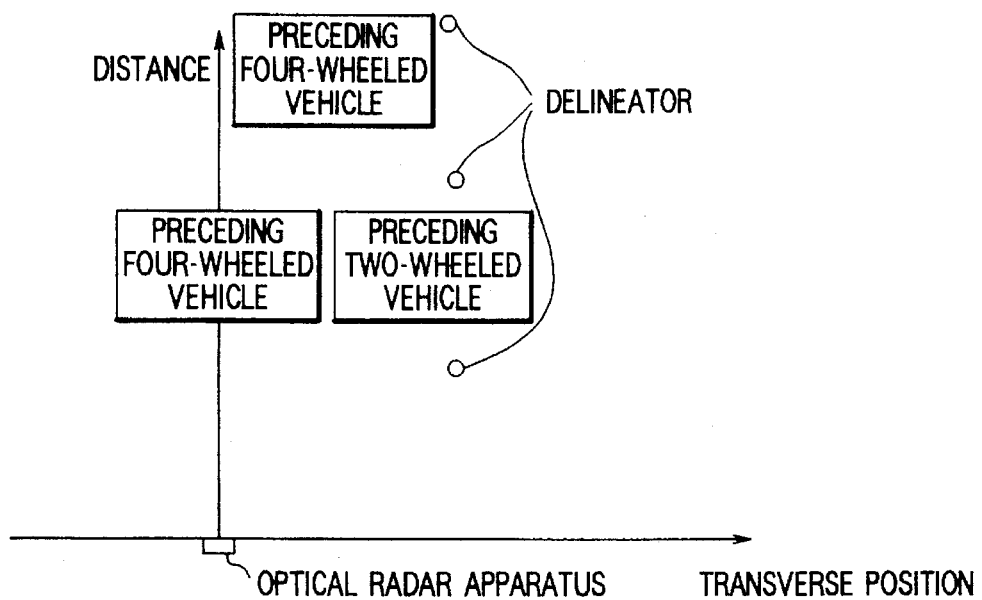
FIG. 3(a) illustrates a running environment ahead of the subject vehicle.
Figure 3B:
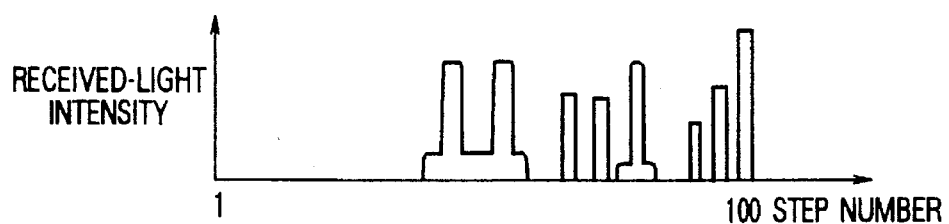
FIG. 3(b) illustrates the intensity distribution of the received light with respect to the scanning direction.

FIGS. 3(a), 4(a), 5(a), 6(a), and 7(a) show actual running environments when the intensity distributions of the received light with respect to the scanning direction are as indicated in FIGS. 3(b), 4(b), 5(b), 6(b), and 7(b), respectively. When the obstacle identifying device 5 stores the intensity of the received light of the pulsed laser beam scanned for 100 steps as described above, it obtains the intensity distribution of the received light beam with respect to the scanning direction, as illustrated in FIG. 3(b), so as to determine whether the object 6 is, for example, a vehicle or another kind of obstacle, based on this received-light intensity distribution. FIG. 3(a) shows an actual running environment when the intensity distribution of the received light or laser beam with respect to the scanning direction is indicated in FIG. 3(b). The maximum distance to be detected by the intensity of the received light reflected from a vehicle body portion other than a reflector of a preceding four-wheeled vehicle will be hereinafter referred to as a "body detection threshold distance".

An example will now be given of the object 6 in the form of a preceding four-wheeled vehicle present within the body detection threshold distance. In the steps in which the reflected light is continuously received, a level of the intensity of the received light reflected from the vehicle body is relatively low, while the levels of the intensities of the received light reflected from a pair of reflectors, which are provided in a pair of tail lamps, are comparatively high and equal to each other. Thus, the intensity distribution pattern of the received light shown in FIG. 4(b) can be obtained. In the steps in which the reflected light is continuously received, such a pattern can be considered to have a ratio which is equal to or higher than a predetermined ratio of a low level of the light intensity to a pair of high levels of the light intensity which are equal in magnitude. As a consequence, the obstacle identifying device 5 can identify the presence of a preceding four-wheeled vehicle which is present within the body detection threshold distance since it recognizes the pattern shown in FIG. 4(b) in the intensity distribution of the received light with respect to the scanning direction shown in FIG. 3(b).

An example will now be given of the object 6 in the form of a preceding four-wheeled vehicle present without the body detection threshold distance. In the steps in which the reflected light is received, a level of the intensity of the received light reflected from the vehicle body is generally too low to be detected by the received-light intensity detection device 4. However, since two levels of the intensity of the received light reflected by a pair of reflectors are comparatively high and equal in magnitude, the distribution pattern of the received-light intensity shown in FIG. 5(b) can be obtained. Such a pattern can be considered to have a ratio which is equal to or higher than a predetermined ratio of a low level of the light intensity to a pair of high levels of the light intensity which are equal in magnitude. As a consequence, the obstacle identifying device 5 can identify the presence of a preceding four-wheeled vehicle which is present without the body detection threshold distance since it recognizes the pattern shown in FIG. 5(b) in the intensity distribution of the received light with respect to the scanning direction shown in FIG. 3(b).

An example will further be given of the object 6 in the form of a preceding two-wheeled vehicle present within the body detection threshold distance. In the steps in which the reflected light is received, a level of the intensity of the received light reflected from the vehicle body and the human body is comparatively low, while a level of the intensity of the received light reflected from the reflector is relatively high. Thus, the distribution pattern of the received light with respect to the scanning direction shown in FIG. 6(b) can be obtained. Such a pattern can be considered to have a ratio which is equal to or higher than a predetermined ratio of a low level of the light intensity to a single high level of the light intensity in the steps in which the reflected light is continuously received. In consequence, the obstacle identifying device 5 can identify the presence of a preceding two-wheeled vehicle which is present within the body detection threshold distance since it recognizes the distribution pattern shown in FIG. 6(b) in the intensity distribution of the received light with respect to the scanning direction shown in FIG. 3(b).

An example will further be given of the object 6 in the form of a delineator. In the steps in which the reflected light is received, a level of the intensity of the received light reflected from a reflector is comparatively high, and there is no level of the light intensity equivalent to that of the light from the reflector. Hence, the distribution pattern of the received light with respect to the scanning direction shown in FIG. 7(b) can be obtained. As a result, the obstacle identifying device 5 can identify the presence of a delineator ahead of the subject vehicle since it recognizes the pattern shown in FIG. 7(b) in the intensity distribution with respect to the scanning direction shown in FIG. 3(b).

In the optical radar apparatus of the present invention constructed as described above, the light emitting device 1 and the scanner 2 together constitute an optical radiation means; the light receiving device 3 constitutes a light receiving means; the received-light intensity detection device 4 constitutes a received-light detection means; and the obstacle identifying device 5 constitutes an obstacle identifying means.

According to the above-mentioned first embodiment, the optical radar apparatus has the advantage of identifying a delineator or a preceding two-wheeled or four-wheeled vehicle so that a running environment can be assessed or recognized. Hence, a preceding vehicle running in the same lane with the subject vehicle can be identified with high accuracy.

Second Embodiment

The construction of a second embodiment of the present invention is similar to that shown in the block diagram illustrated in FIG. 1. The scanning by the pulsed laser beam is also performed as shown in FIG. 2. The second embodiment differs from the first embodiment in that the obstacle identifying device 5 is not only constructed and operated as described in the first embodiment, but also performs the following operation. That is, it calculates the distance to an object 6 in each step and stores therein the distance thus calculated. Such calculations are each made according to the following equation based on the propagation lag duration from the time when the pulsed light is emitted to the time when the reflected light is received.

$$L = C \times t/2$$

wherein L indicates calculated distance (m); C represents the speed of light ($3 \times 10^8$ m/s); and t indicates propagation lag duration (s).

Figure 3C:
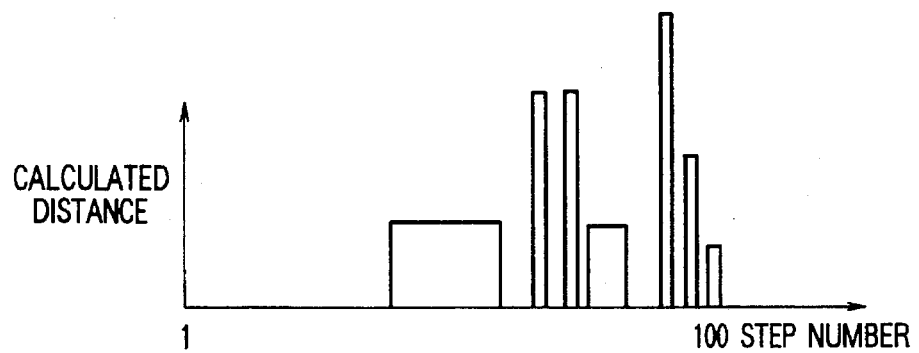
FIG. 3(c) illustrates the distribution of the calculated distance with respect to the scanning direction.

When the obstacle identifying device 5 stores the intensity of the received light and the calculated distance in each of the 100 steps described above, it determines whether the object 6 is, for example, a vehicle or another kind of obstacle, as will be discussed below, based on the intensity distribution of the received light with respect to the scanning direction shown in FIG. 3(b) and the distribution of the calculated distance with respect to the scanning direction shown in FIG. 3(c). In the second embodiment, FIG. 3(a) illustrates an actual running environment when the intensity distribution of the received light with respect to the scanning direction and the distribution of the calculated distance with respect to the scanning direction are obtained as shown in FIGS. 3(b) and 3(c), respectively.

Figure 4A:
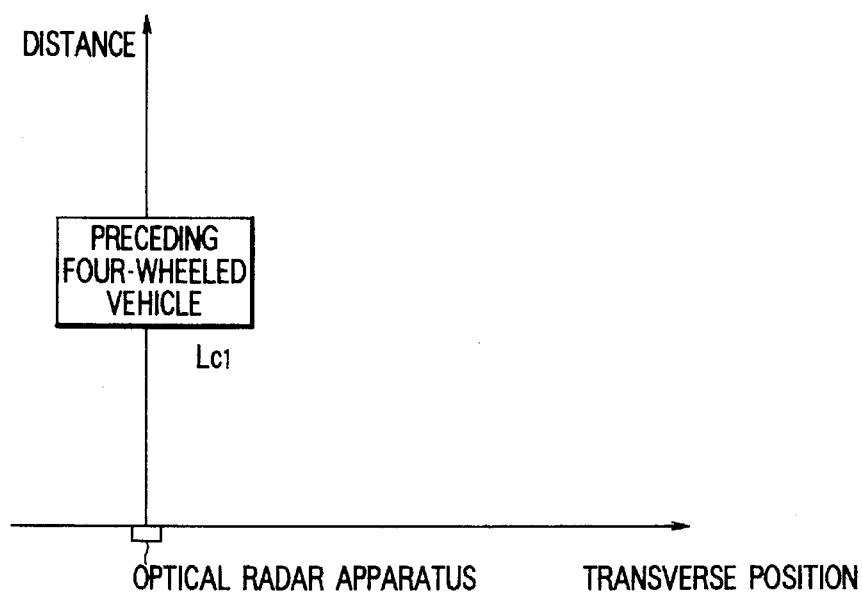
FIG. 4(a) illustrates a running environment of a preceding four-wheeled vehicle.
Figure 4B:
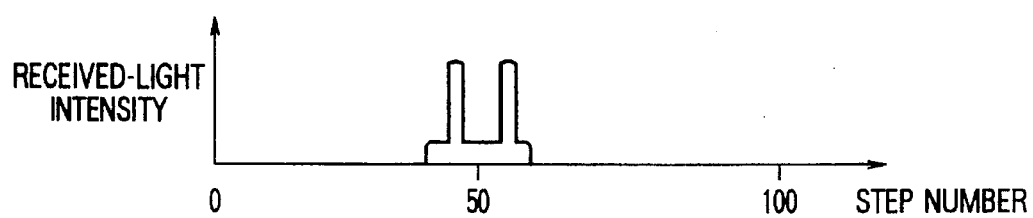
FIG. 4(b) illustrates the intensity distribution of the received light from a preceding four-wheeled vehicle, such a distribution being obtained with respect to the scanning direction.
Figure 4C:
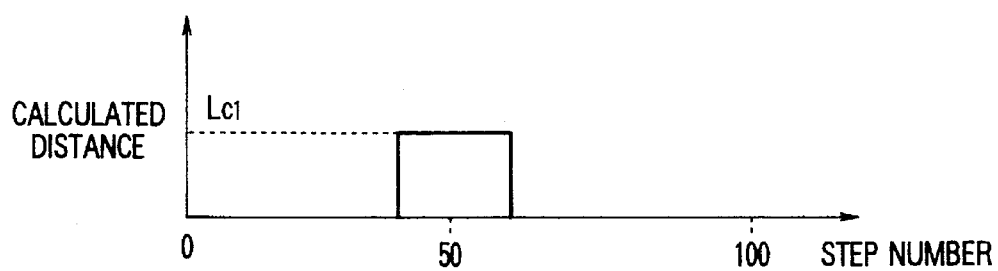
FIG. 4(c) illustrates the distribution of the calculated distance to a preceding four-wheeled vehicle, such a distribution being obtained with respect to the scanning direction.

An example will now be given of the object 6 which is a preceding four-wheeled vehicle present within the body detection threshold distance. The distribution pattern of the received-light intensity with respect to the scanning direction can be obtained as indicated in FIG. 4(b), as shown in the first embodiment. In the steps in which the reflected light is continuously received, such a pattern can be considered to have a ratio which is equal to or higher than a predetermined ratio of a low level of the light intensity to a pair of high levels of the light intensity which are equal in magnitude. On the other hand, in the steps in which the reflected light is received, the distribution pattern of the calculated distance with respect to the scanning direction is formed as follows. All values of the obtained distance data are continuously equal, and the width of the number of the steps detected falls within a predetermined range, as illustrated in FIG. 4(c). Thus, the obstacle identifying device 5 can identify the presence of a preceding four-wheeled vehicle at a distance of Lc1(m) away from the subject vehicle when it recognizes the patterns shown in FIGS. 4(b) and 4(c) in the distributions of the received-light intensity and the calculated distance with respect to the scanning direction as shown in FIGS. 3(b) and 3(c), respectively.

Figure 5A:
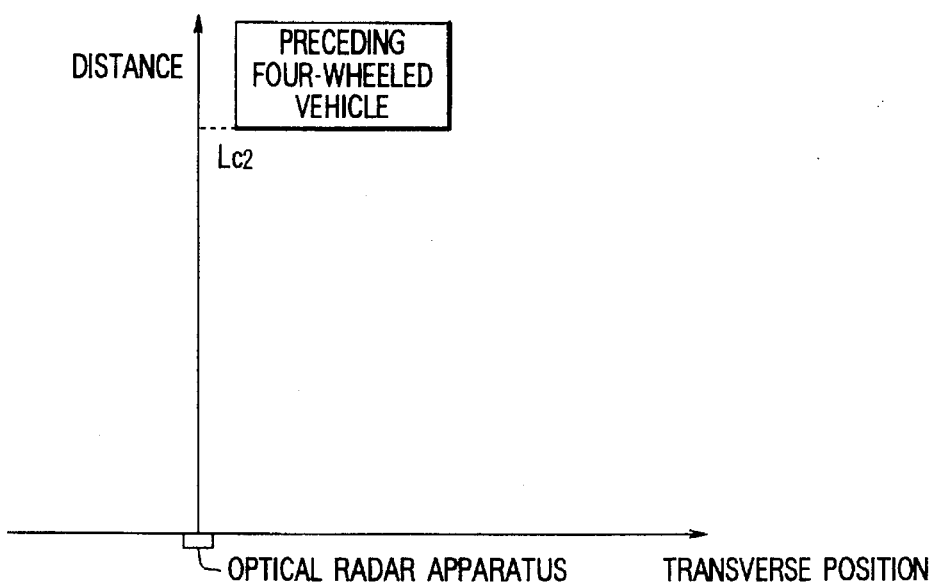
FIG. 5(a) illustrates a running environment of a preceding four-wheeled vehicle.
Figure 5B:
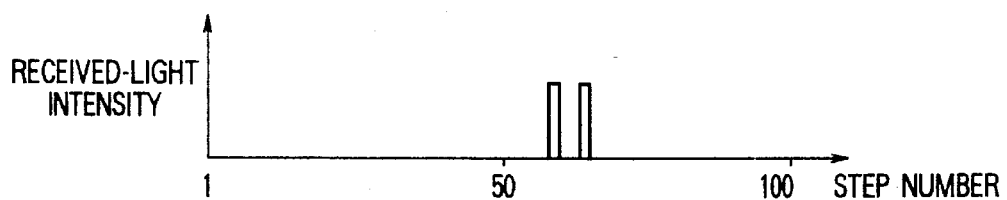
FIG. 5(b) illustrates the intensity distribution of the received light from a preceding four-wheeled vehicle, such a distribution being obtained with respect to the scanning direction.
Figure 5C:
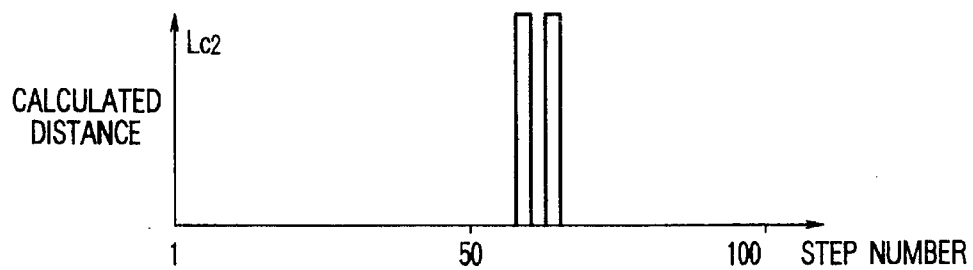
FIG. 5(c) illustrates the distribution of the calculated distance to a preceding four-wheeled vehicle, such a distribution being obtained with respect to the scanning direction.

An example will now be given of the object 6 which is a preceding four-wheeled vehicle present without the body detection threshold distance. The distribution pattern of the received-light intensity with respect to the scanning direction can be obtained as indicated in FIG. 5(b), as shown in the first embodiment. Such a pattern can be considered to have a ratio which is equal to or higher than a predetermined ratio of a low level of the light intensity to a pair of high levels of the light intensity which are equal in magnitude. On the other hand, in the steps in which the reflected light is received, the distribution pattern of the calculated distance with respect to the scanning direction is formed as follows. All values representing the obtained distance data are equal, and the width of the number of the steps detected falls within a predetermined range, as illustrated in FIG. 5(c). Thus, the obstacle identifying device can identify the presence of a preceding four-wheeled vehicle at a distance of Lc2(m) away from the subject vehicle when it recognizes the patterns shown in FIGS. 5(b) and 5(c) in the distributions of the received-light intensity and the calculated distance with respect to the scanning direction as shown in FIGS. 3(b) and 3(c), respectively.

Figure 6A:
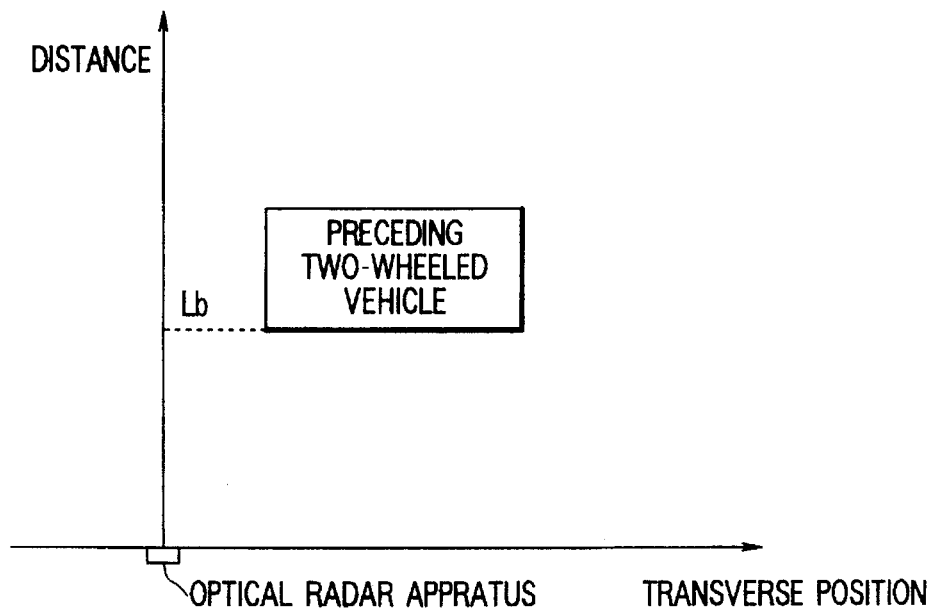
FIG. 6(a) illustrates a running environment of a preceding two-wheeled vehicle.
Figure 6B:
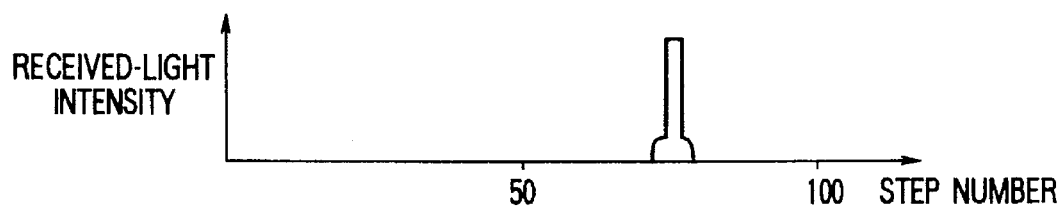
FIG. 6(b) illustrates the intensity distribution of the received light which is reflected from a preceding two-wheeled vehicle, such a distribution being obtained with respect to the scanning direction.
Figure 6C:
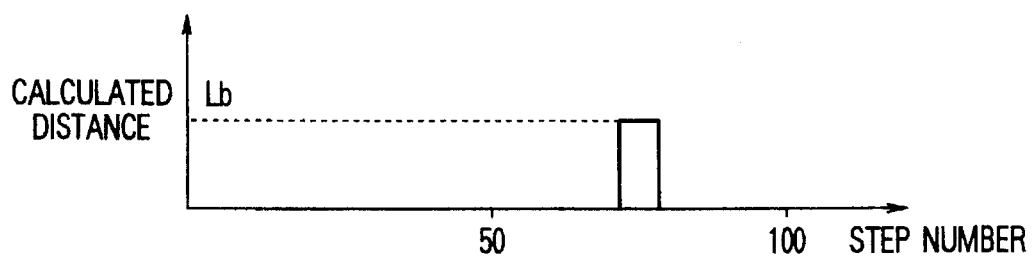
FIG. 6(c) illustrates the distribution of the calculated distance to a preceding two-wheeled vehicle, such a distribution being obtained with respect to the scanning direction.

An example will further be given of the object 6 which is a preceding two-wheeled vehicle present within the body detection threshold distance. The distribution pattern of the received-light intensity with respect to the scanning direction can be obtained as indicated in FIG. 6(b), as shown in the first embodiment. In the steps in which the reflected light is continuously received, such a pattern can be considered to have a ratio which is equal to or higher than a predetermined ratio of a low level of the light intensity to a single high level of the light intensity. On the other hand, in the steps in which the reflected light is received, the distribution pattern of the calculated distance with respect to the scanning direction is formed as follows. All values representing the obtained distance data are equal, and the width of the number of the steps detected falls within a predetermined range, as illustrated in FIG. 6(c). Thus, the obstacle identifying device 5 can identify the presence of a preceding two-wheeled vehicle at a distance of Lb(m) away from the subject vehicle when it recognizes the patterns shown in FIGS. 6(b) and 6(c) in the distributions of the received-light intensity and the calculated distance with respect to the scanning direction as shown in FIGS. 3(b) and 3(c), respectively.

Figure 7A:
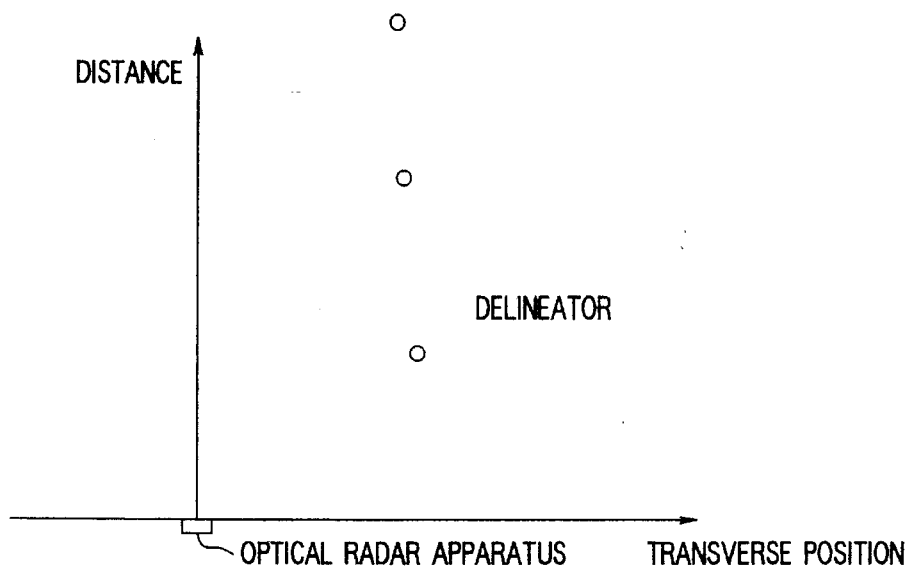
FIG. 7(a) illustrates the position of delineators.
Figure 7B:
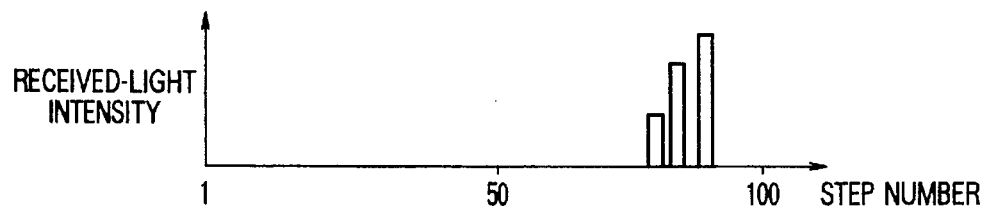
FIG. 7(b) illustrates the intensity distribution of the received light from delineators, such a distribution being obtained with respect to the scanning direction.
Figure 7C:
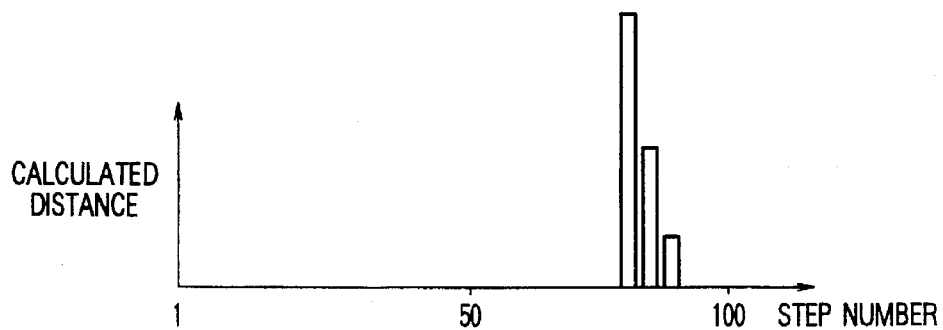
FIG. 7(c) illustrates the distribution of the calculated distance to delineators, such a distribution being obtained with respect to the scanning direction.

An example will further be given of the object 6 which is a delineator. In this case, too, the obstacle identifying device 5 can identify the presence of a delineator at a distance of Ld(m) away from the subject vehicle when it recognizes the patterns shown in FIGS. 7(b) and 7(c) in the distributions of the received-light intensity and the calculated distance with respect to the scanning direction as illustrated in FIGS. 3(b) and 3(c), respectively.

According to the second embodiment, the optical radar apparatus identifies the object 6 based on two factors, that is, the distributions of the received-light intensity and the calculated distance, thereby exerting the effect of identifying the object with higher accuracy over the apparatus of the first embodiment.

Figure 8A:
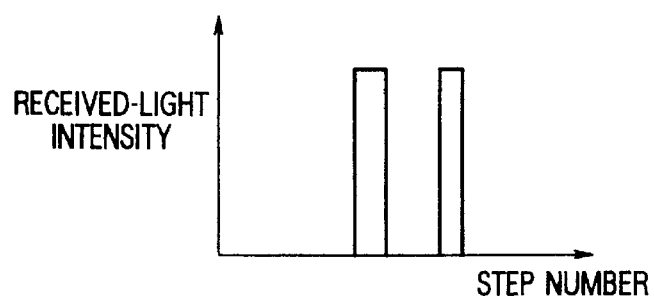
FIG. 8(a) shows one example of identifying an obstacle according to a second embodiment and also illustrates the intensity distribution of the received light with respect to the scanning direction.
Figure 8B:
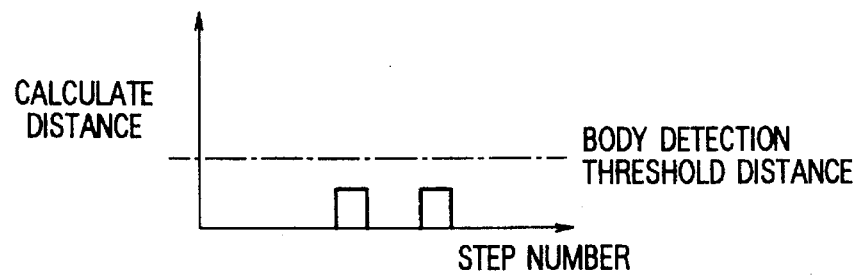
FIG. 8(b) illustrates the distribution of the calculated distance with respect to the scanning direction in the same example.

It will now be considered by way of example that two levels of the intensity of the received light with respect to the scanning direction are equal in magnitude and comparatively high, as shown in FIG. 8(a), and that two values representing the calculated distance to the object present within the body detection threshold distance are equal, as illustrated in FIG. 8(b).

In the first embodiment, since the distribution pattern of the received-light intensity shown in FIG. 8(b) is similar to that shown in FIG. 5(b), it is determined that the object is a four-wheeled vehicle. However, in the second embodiment, since the two values representing the calculated distance within the body detection threshold distance are equal, as indicated by FIG. 8(b), it is not determined at least that the object is a four-wheeled vehicle.

As indicated by the broken lines in FIG. 1, a running speed detection device 7 for detecting the running speed of the subject vehicle is further added to the construction shown in the second embodiment. Thus, the running speed detected by this device 7 and a change in the distance obtained by the obstacle identifying device 5 in chronological order (for example, the relative speed may be obtained by the above-mentioned two factors) are employed so as to detect the running speed of the object 6. This further makes it possible to determine whether the object 6 is a combination of preceding two-wheeled vehicles running in parallel to each other, a combination of a delineator and a preceding two-wheeled vehicle, or a stopped obstacle (two reflectors other than a preceding vehicle). In consequence, a preceding vehicle can be identified with higher accuracy.

For example, if two values representing the relative speed of the two obstacles indicated by FIGS. 8(a) and 8(b) are equal to the speed of the subject vehicle, such obstacles can be determined to be stationary or stopped obstacles (two reflectors other than a preceding vehicle). If one value representing the relative speed is equal to that of the subject vehicle, and if the other value representing the relative speed differs from that of the subject vehicle, such two obstacles can be determined to be a delineator and a preceding two-wheeled vehicle. Further, if both values representing the relative speed of the two obstacles differ from that of the subject vehicle, such obstacles can be determined to be a pair of preceding two-wheeled vehicles running in parallel to each other.

In the optical radar apparatus constructed as described above according to the second embodiment of the present invention, the light emitting device 1 and the scanner 2 form optical radiation means; the light receiving device 3 forms light receiving means; the received-light intensity detection device 4 constitutes received-light detection means; the obstacle identifying device 5 constitutes distance calculation means; and the running speed detection device 7 forms running speed detection means.

Third Embodiment

The construction of a third embodiment is similar to that shown in the block diagram illustrated in FIG. 1. The scanning of the pulsed laser beam is also performed as shown in FIG. 2. For example, the stepping motor 22 allows the mirror 21 to rotate at an angle of 0.05°, and the scanning is performed for 100 steps in total from the left to the right, as illustrated in FIG. 2. In this scanning, the centers of the 50th step and the 51st step match that of the optical axis of the optical radar apparatus. The third embodiment differs from the first embodiment in that the obstacle identifying device 5 is not only constructed and operated as described in the first embodiment, but also performs the following operation. That is, the device 5 calculates a distance to the object 6 based on the propagation lag duration from the time when pulsed light is emitted to the time when the reflected light is received so as to store the calculated distance therein, as shown in the second embodiment. The obstacle identifying device 5 also calculates the relative speed of the object 6 to the subject vehicle based on a change in the calculated distance in chronological order. The device 5 is further provided with below-mentioned obstacle-width calculation means for calculating the width of the object 6. It also calculates the scanning angle according to the number of steps of the stepping motor 22 so as to store it therein. Since the mirror 21 is rotated at 0.05° for one step, the pulsed light reflected by the mirror 21 is deflected at 0.1°, which is double as large as the rotation angle of the mirror 21. The scanning span is set to be 5° either to the right or left side. The speed detection device 7 indicated by the broken lines in FIG. 1 is connected to the obstacle identifying device 5.

It will now be considered that the actual running environment is as indicated by FIG. 3(a) used in the first embodiment when the obstacle identifying device 5 stores the values representing the intensity of the received light, the calculated distance and the scanning angle for the above-mentioned 100 steps. Then, the intensity distribution of the received light with respect to the scanning direction can be obtained as indicated in FIG. 3(b), while the distribution of the calculated distance with respect to the scanning direction can be obtained as indicated in FIG. 3(c).

Figure 9:
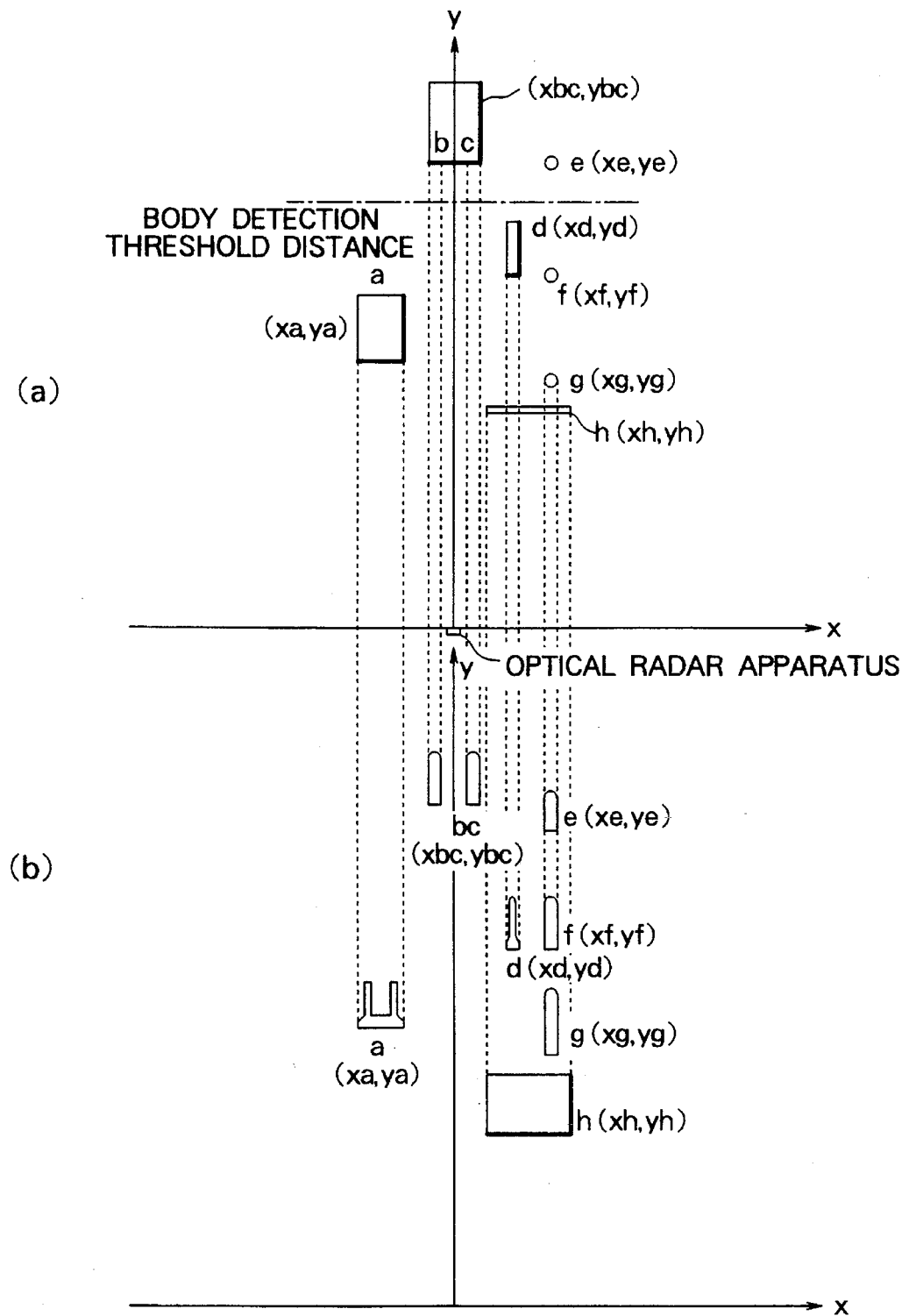
FIG. 9 shows one example of identifying an obstacle according to a third embodiment of the present invention, wherein (a) illustrates the intensity distribution of the received light with respect to the scanning direction, and (b) illustrates the positions of the obstacles in the X–Y coordinates as well as the intensity of the received light.

The scanning angle of the pulsed light and the calculated distance in each step are converted into X-Y coordinates data in the X-Y coordinate system shown at (a) in FIG. 9 according to the following expressions.

$$x_i = d_i \times \sin \theta_i$$

$$y_i = d_i \times \cos \theta_i$$

wherein $x_i$ end $y_i$ in the i-th step respectively indicate X coordinate and Y coordinate in the X-Y coordinates; $d_i$ represents the calculated distance in the i-th step; and $\theta_i$ indicates the scanning angle in the i-th step. (b) in FIG. 9 illustrates the X-Y coordinate data obtained under the running environment shown at (a) in FIG. 9.

Among the X-Y coordinate data shown at (b) in FIG. 9, the values which are equal to each other in the Y distance in the adjacent steps are grouped into sections, which are coded as a, b, c, d, e, f, g and h from the left to the right-hand side of (b) in FIG. 9. The obstacle identifying device 5 calculates the following factors with respect to each of the obstacles: the width w according to a disparity of the X coordinates between the two right and left ends; and the X coordinate at the center of the width w. The obstacle identifying device 5 has predetermined ranges of the widths of, for example, a preceding four-wheeled vehicle and a two-wheeled vehicle.

The obstacle a, falls within a predetermined range of the width of a four-wheeled vehicle. As shown in the second embodiment, all the values representing the distance to the obstacle a in the Y direction are equal as indicated in FIG. 4(c), while the distribution pattern of the received-light intensity with respect to the scanning direction is indicated as shown in FIG. 4(b). Hence, the presence of a preceding four-wheeled vehicle can be identified in a position (xa, ya) in the X-Y coordinate system.

The obstacle b does not fall within a predetermined range of the width of a four-wheeled vehicle. However, the obstacle b is combined with the obstacle c so that the combined width falls within the above-mentioned predetermined range. As shown in the second embodiment, all the values representing the distance of such a combination of the obstacles b and c are equal in the Y direction, and the distribution pattern in the received-light intensity with respect to the scanning direction is obtained, as indicated in FIG. 4(b). Hence, the presence of a preceding four-wheeled vehicle can be identified in a position (xbc, ybc) in the X-Y coordinate system.

The obstacle d falls within a predetermined range of the width of a two-wheeled vehicle. As shown in the second embodiment, the distance to the obstacle d in the Y direction is within the body detection threshold distance, and the distribution pattern of the received-light intensity with respect to the scanning direction is indicated as shown in FIG. 6(b). Hence, the presence of a preceding two-wheeled vehicle can be identified in a position (xd, yd) in the X-Y coordinate system. Even if the distance of the obstacle d in the Y direction is equal to that of the obstacle f, and even if the width of a combination of the obstacles d and f falls within a predetermined range of a four-wheeled vehicle, they can also be each identified according to the distribution pattern of the received-light intensity with respect to the scanning direction. Moreover, even if the obstacles d and f are present without the body detection threshold distance, they can be each identified according to a change in the calculated distance in the chronological order detected by the obstacle identifying device 5, for example, according to a disparity in the relative speed.

Neither of the obstacle e nor the obstacle g falls within a predetermined range of the width of a four-wheeled vehicle. However, as shown in the second embodiment, the distribution patterns of the received-light intensity and the calculated distance can be shown as in FIGS. 7(b) and 7(c), respectively. Therefore, the presence of delineators can be identified in positions (xe, ye) and (xg, yg) in the X-Y coordinate system.

The obstacle h exceeds a predetermined range of the width of a four-wheeled vehicle, and is uniform in the intensity of the received light and equal in the calculated distance. Thus, the presence of a road sign can be identified in the position (xh, yh) in the X-Y coordinate system.

Although in the third embodiment the width of the object 6 is calculated to identify the object 6, the height of the object 6 may be employed, instead of the width thereof, to identify the object 6 when the two-dimensional scanning is performed. Or alternatively, the area of the object 6 may be employed to identify the object 6.

If the calculated height is employed to identify the object 6, an object-height calculation means, for example, may be provided for the obstacle identifying device 5 so as to calculate the height of the object 6 based on the scanning angle of the scanner 2 and the distance calculated by the distance calculation means of the obstacle identifying device 5. The object 6 may thus be identified based on the distance calculated by the distance calculation means, the distribution pattern of the received-light intensity with respect to the scanning direction and the calculated height of the object 6.

If the calculated area is employed to identify the object 6, an object-area calculation means, for example, may be provided for the obstacle identifying device 5 so as to calculate the area of the object 6 based on the scanning angle of the scanner 2 and the distance calculated by the distance calculation means of the obstacle identifying device 5. The object 6 may thus be identified based on the distance calculated by the distance calculation means, the distribution pattern of the received-light intensity with respect to the scanning direction and the calculated area of the object 6.

The operation of the third embodiment will now be described with reference to a flow chart of FIG. 10.

Figure 10:
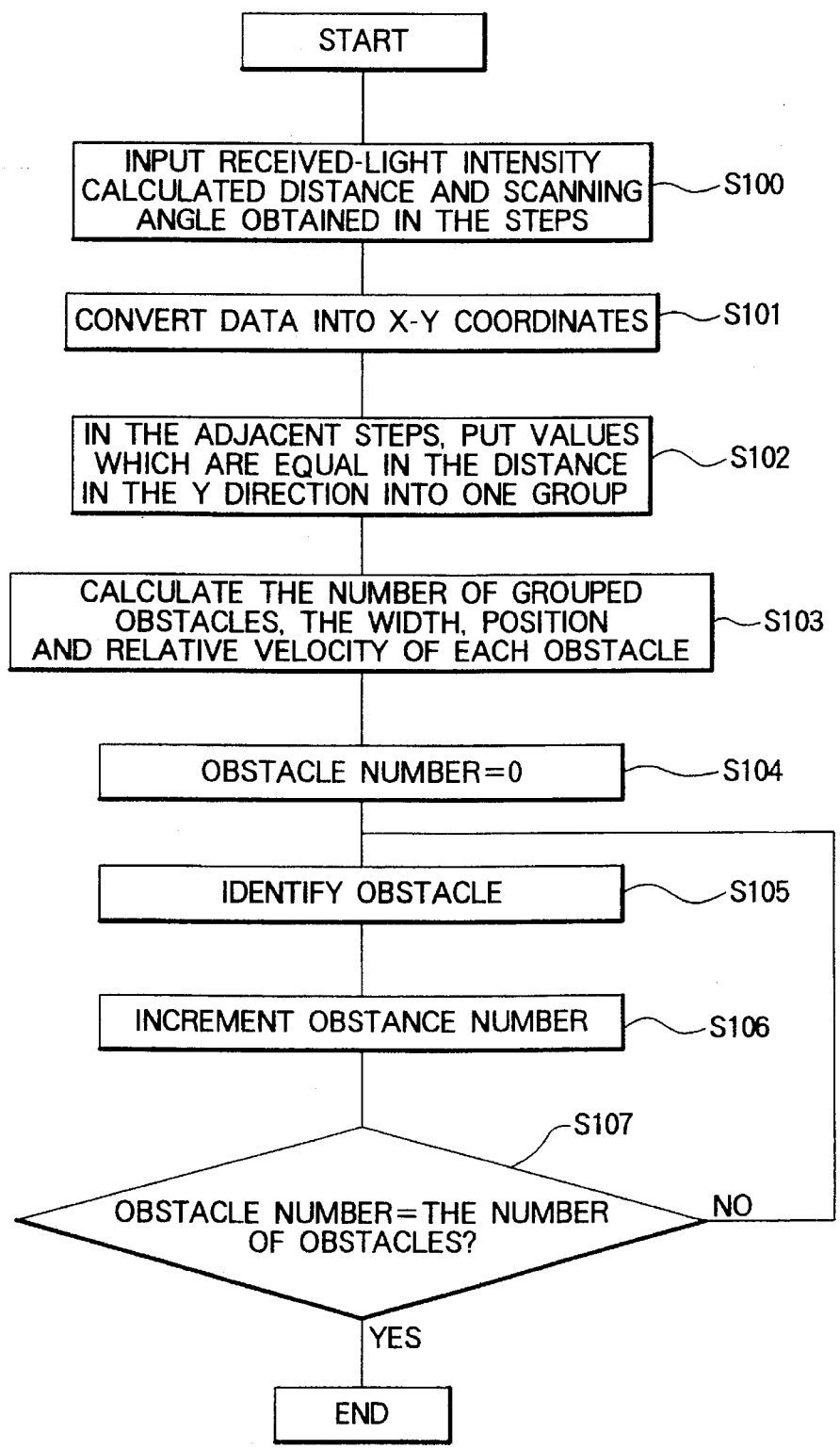
FIG. 10 is a flow chart illustrative of an example of the process of identifying an obstacle according to the third embodiment.

FIG. 10 illustrates the process of identifying a vehicle by the optical radar apparatus of the third embodiment. All the data representing the received-light intensity, the calculated distance and the scanning angle, obtained in 100 steps, are first input into the obstacle identifying device 5 (step S100). Then, the data representing the calculated distance and the scanning angle obtained in 100 steps are converted into the X-Y coordinates (S101). Among the converted data, in the adjacent scanning steps, the values which are substantially equal in the distance in the Y direction (a disparity between the values in the distance in the Y direction is equal to or less than a predetermined value) are grouped (S102). The width and the relative speed of each object 6 are calculated according to the grouped data (S103). Subsequently, the obstacle number is set to be 0 (S104), and when the obstacle is identified (S105), the obstacle number is incremented (S106). It is then determined whether the obstacle number equals the number of the detected obstacles (S107). If the answer in S107 is YES, the processing is ended. If the answer in S107 is NO, the flow returns to S105, that is, the obstacle is repeatedly identified as many times as the number of the detected obstacles.

Figure 11:
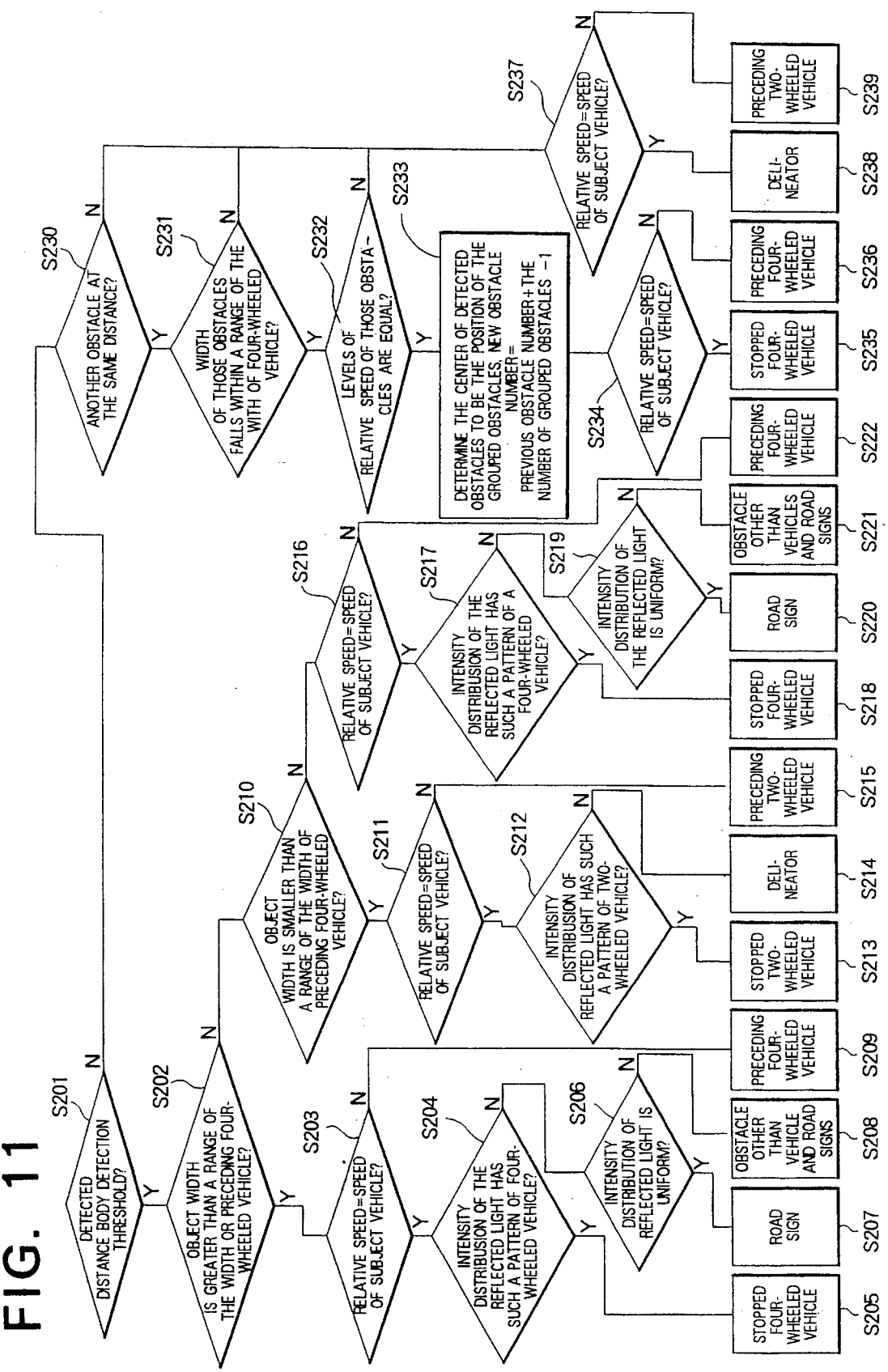
FIG. 11 is a flow chart illustrative of the detailed processing by an obstacle identifying section shown in the flow chart of FIG. 10.

FIG. 11 is a flow chart illustrative of the detailed processing for identifying an obstacle in step S105. It is first determined whether the detected distance is within the body detection threshold distance (S201). If the answer in S201 is YES, it is determined whether the width of the object exceeds a predetermined range of the width of a preceding four-wheeled vehicle (S202). If the answer in S202 is YES, it is determined whether the relative speed equals the speed of the subject vehicle obtained by the speed detection device 7 (S203). If the answer in S203 is YES, it is determined whether the intensity distribution of the reflected light has such a pattern obtained by a four-wheeled vehicle (S204). If the answer in S204 is YES, it is identified that the detected obstacle is a stationary or stopped four-wheeled vehicle (S205).

On the other hand, if the answer in S204 is NO, it is determined whether the intensity distribution of the reflected light is uniform (S206). If the answer in S206 is YES, it is identified that the detected obstacle is a road sign (S207). If the answer in S206 is NO, it is identified that the detected obstacle is another type of obstacle other than vehicles and road signs (S208).

If it is determined in S203 that the relative speed is not equal to the speed of the subject vehicle, it is determined that the detected obstacle is a preceding four-wheeled vehicle (S209).

If it is determined in S202 that the width of the object does not exceed a predetermined range of the width of a preceding four-wheeled vehicle, it is determined whether such a width is smaller than the above-mentioned range (S210). If the answer in S210 is YES, it is determined whether the relative speed equals the speed of the subject vehicle (S211). If the answer in S211 is YES, it is determined whether the intensity distribution of the reflected light has such a pattern obtained by a two-wheeled vehicle (S212). If the answer in S212 is YES, it is identified that the detected obstacle is a stopped two-wheeled vehicle (S213). If the answer in S212 is NO, it is identified that the detected obstacle is a delineator (S214).

If it is determined in S211 that the relative speed is not equal to the speed of the subject vehicle, it is identified that the detected obstacle is a preceding two-wheeled vehicle (S215).

If it is determined in S210 that the width of the object is not smaller than a range of the width of a preceding four-wheeled vehicle, it is determined whether the relative speed equals the speed of the subject vehicle (S216). If the answer in S216 is YES, it is determined whether the intensity distribution of the reflected light has such a pattern obtained by a four-wheeled vehicle (S217). If the answer in S217 is YES, it is identified that the detected obstacle is a stationary or stopped four-wheeled vehicle (S218).

If the answer in S217 is NO, it is determined whether the intensity distribution of the reflected light is uniform (S219). If the answer in S219 is YES, it is identified that the detected obstacle is a road sign (S220). It the answer in S219 is NO, it is identified that the detected obstacle is another type of obstacle other than vehicles and road signs (S221).

If it is determined in S216 that the relative speed is not equal to the speed of the subject vehicle, it is identified that the detected obstacle is a preceding four-wheeled vehicle (S222).

If it is determined in S201 that the detected distance exceeds the body detection threshold distance, it is determined whether there is another obstacle at the same distance (S230). If the answer in S230 is YES, it is determined whether the width of those obstacles falls within a range of a predetermined width of a four-wheeled vehicle (S231). If the answer in S231 is YES, it is determined whether levels of the relative speed of the obstacles coincide with each other (S232). If the answer in S232 is YES, the obstacles are grouped into a single vehicle in such a way that the farthest distance in the transverse direction of the detected obstacles is determined to be the width of the combined vehicle, and the center of the width is determined to be the position of the vehicle. The number of the grouped obstacles is added to the obstacle number and is further subtracted by one, and the resultant number is determined to be a new obstacle number (S233). Then, it is determined whether the relative speed equals the speed of the subject vehicle (S234). If the answer in S234 is YES, it is identified that the grouped vehicle is a stationary or stopped four-wheeled vehicle (S235). If the answer in S234 is NO, it is identified that the grouped vehicle is a preceding four-wheeled vehicle (S236).

If it is determined in S230 that there is no obstacle at the same distance, or if it is determined in S231 that the width of the obstacles at the same distance does not fall within a predetermined range of the width of a four-wheeled vehicle, or if it is determined in S232 that levels of the relative speeds of the obstacles do not coincide with each other, it is determined whether each level of the relative speed equals the speed of the subject vehicle (S237). If the answer in S237 is YES, it is identified that the detected obstacle is a delineator (S238). If the answer in S237 is No, on the other hand, it is identified that the detected obstacle is a preceding two-wheeled vehicle (S239).

In the optical radar apparatus constructed as described above according to the third embodiment of the present invention, the light emitting device 1 and the scanner 2 together constitute an optical radiation means; the light receiving device 3 constitutes a light receiving means; the received-light intensity detection device 4 constitutes a received-light intensity detection means; the obstacle identifying device 5 constitutes an obstacle identifying means and an object-width calculation means; and the running speed detection device 7 constitutes a running speed detection means.

According to the optical radar apparatus of the third embodiment, the object is identified using the following factors: the width of the object, the speed of the subject vehicle, the relative speed of the object to the subject vehicle, the running speed of the object, and the like. Hence, this optical radar apparatus can recognize a running environment, that is, it can identify various types of obstacles with much higher accuracy than with the apparatuses of the first and second embodiments. Accordingly, it can identify a preceding vehicle running in the same lane as with the subject vehicle with higher accuracy.

What is claimed is:

1. A vehicular optical radar apparatus comprising:

optical radiation means for scanning and radiating light;

light receiving means for receiving light which is radiated by said optical radiation means and is then reflected by an object;

received-light intensity detection means for detecting an intensity of the reflected light;

obstacle identifying means for identifying said object based on a distribution pattern of the received-light intensity detected by said intensity detection means, the distribution pattern being obtained with respect to the direction of scanning performed by said optical radiation means;

distance calculation means for calculating a distance to said object, based on a propagation lag duration from the time when the light is radiated by said optical radiation means to the time when the reflected light is received by said light receiving means; and object-width calculation means for calculating a width of said object based on a scanning angle of said optical radiation means and the distance calculated by said distance calculation means;

wherein said obstacle identifying means identifies said object based on the distance calculated by said distance calculation means, the distribution pattern of the received-light intensity with respect to the scanning direction, and the width of said object.

2. A vehicular optical radar apparatus according to claim 1, further comprising running speed detection means for detecting a running speed of a subject vehicle on which said apparatus is installed, wherein said obstacle identifying means calculates a running speed of said object based on the running speed detected by said running speed detection means and a relative speed of said object to the subject vehicle, the relative speed being calculated by a change in the detected distance to said object in chronological order, thereby identifying said object, based on the distance to said object, the distribution pattern of the received-light intensity with respect to the scanning direction and the running speed of said object.

3. A vehicular optical radar apparatus according to claim 1 wherein said obstacle identifying means identifies that said object is a four-wheeled vehicle when the width of said object falls within a predetermined range and when the distribution pattern of the received-light intensity with respect to the scanning direction is formed such that the intensity of the received light has two high levels with a lower level present therebetween.

4. A vehicular optical radar apparatus according to claim 1 wherein said obstacle identifying means identifies that said object is a road sign when the width of said object extends over a predetermined range and when the distribution pattern of the received-light intensity with respect to the scanning direction is uniform.

5. A vehicular optical radar apparatus according to claim 1, further comprising running speed detection means for detecting a running speed of a subject vehicle on which said apparatus is installed, wherein said obstacle identifying means calculates a running speed of said object based on the running speed detected by said running speed detection means and a relative speed of said object to the subject vehicle, the relative speed being calculated by a change in the detected distance to said object in chronological order, thereby identifying said object, based on the distance to said object, the distribution pattern of the received-light intensity with respect to the scanning direction, and the width and the running speed of said object.

6. A vehicular optical radar apparatus according to claim 1, wherein said obstacle identifying means identifies that said object is a two-wheeled vehicle when the width of said object falls within a predetermined range and when the distribution pattern of the received-light intensity with respect to the scanning direction is formed such that the intensity of the received light has one high level.

7. A vehicular optical radar apparatus according to claim 1, wherein said obstacle identifying means identifies that said object is a delineator when the received-light intensity reflected from a reflector is high, and when there is no level of received-light intensity as high as that of the received-light intensity reflected from the reflector.

* * * * *